US008616115B2

(12) United States Patent  
Magno

(10) Patent No.: US 8,616,115 B2  
(45) Date of Patent: Dec. 31, 2013

(54) BREWING APPARATUS

(75) Inventor: Alessandro Magno, Brembate Sopra (IT)

(73) Assignee: N&W Global Vending S.p.A, Valbrembo (IT)

( * ) Notice: Subject to any disclaimer, the term of this patent is extended or adjusted under 35 U.S.C. 154(b) by 456 days.

(21) Appl. No.: 12/668,162

(22) PCT Filed: May 19, 2008

(86) PCT No.: PCT/IB2008/001234
§ 371 (c)(1),
(2), (4) Date: Apr. 20, 2010

(87) PCT Pub. No.: WO2009/007804
PCT Pub. Date: Jan. 15, 2009

(65) Prior Publication Data
US 2010/0192778 A1    Aug. 5, 2010

(30) Foreign Application Priority Data

Jul. 9, 2007  (IT) ........................................ PN2007A

(51) Int. Cl.
*A47J 31/00*    (2006.01)
(52) U.S. Cl.
USPC ....................................................... 99/289 R
(58) Field of Classification Search
USPC ....... 99/302 P, 302 R, 290, 289 R; 222/146.2, 222/146.5
See application file for complete search history.

(56) References Cited

U.S. PATENT DOCUMENTS

| | | | | |
|---|---|---|---|---|
| 6,173,642 | B1 * | 1/2001 | Obbens et al. | 99/280 |
| 6,510,783 | B1 * | 1/2003 | Basile et al. | 99/289 R |
| 6,553,895 | B2 * | 4/2003 | Wu | 99/289 R |
| 6,739,240 | B2 * | 5/2004 | De Koning et al. | 99/283 |
| 6,807,898 | B2 * | 10/2004 | De Koning et al. | 99/289 R |
| 7,024,985 | B2 * | 4/2006 | Park | 99/302 P |
| 7,322,276 | B2 * | 1/2008 | Nicolini | 99/289 R |
| 7,487,713 | B2 * | 2/2009 | Magno | 99/302 P |
| 2004/0177761 | A1 * | 9/2004 | Park | 99/279 |

FOREIGN PATENT DOCUMENTS

| | | |
|---|---|---|
| EP | 0407365 A1 | 1/1991 |
| EP | 1306041 A1 | 5/2003 |
| WO | 01/74212 A1 | 10/2001 |

OTHER PUBLICATIONS

International Search Report and Written Opinion as issued in International Application No. PCT/IB2008/001234 filed May 19, 2008.
International Preliminary Report on Patentability from PCT/IB2008/001234, Aug. 13, 2009.

* cited by examiner

*Primary Examiner* — Tu B Hoang
*Assistant Examiner* — Frederick Calvetti
(74) *Attorney, Agent, or Firm* — Dorsey & Whitney LLP

(57) ABSTRACT

A brewing apparatus, in particular for brewed beverage vending machines, the brewing apparatus having a fixed axis; a fixed frame; a reversible drive; and a number of movable driven members all connected directly or indirectly to the drive to only oscillate about the fixed axis and/or move radially with respect to the fixed axis.

18 Claims, 12 Drawing Sheets

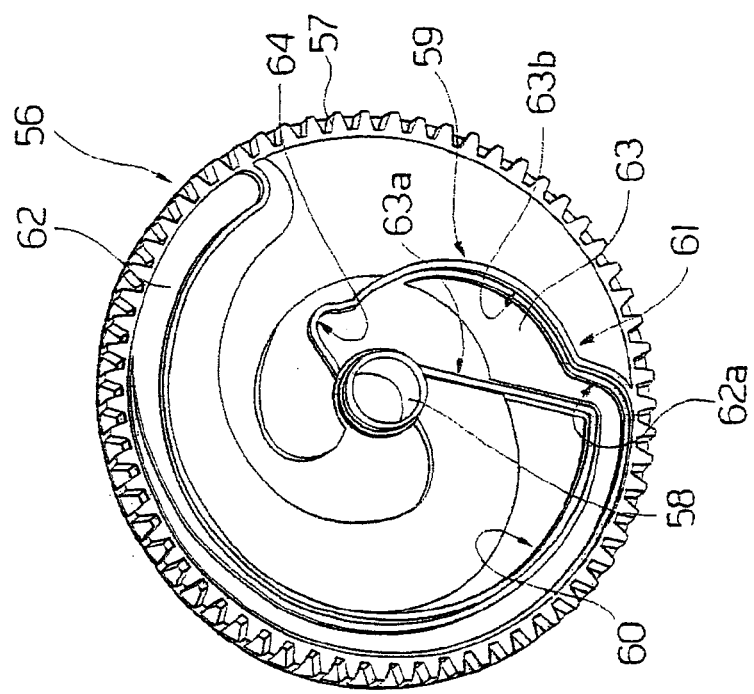
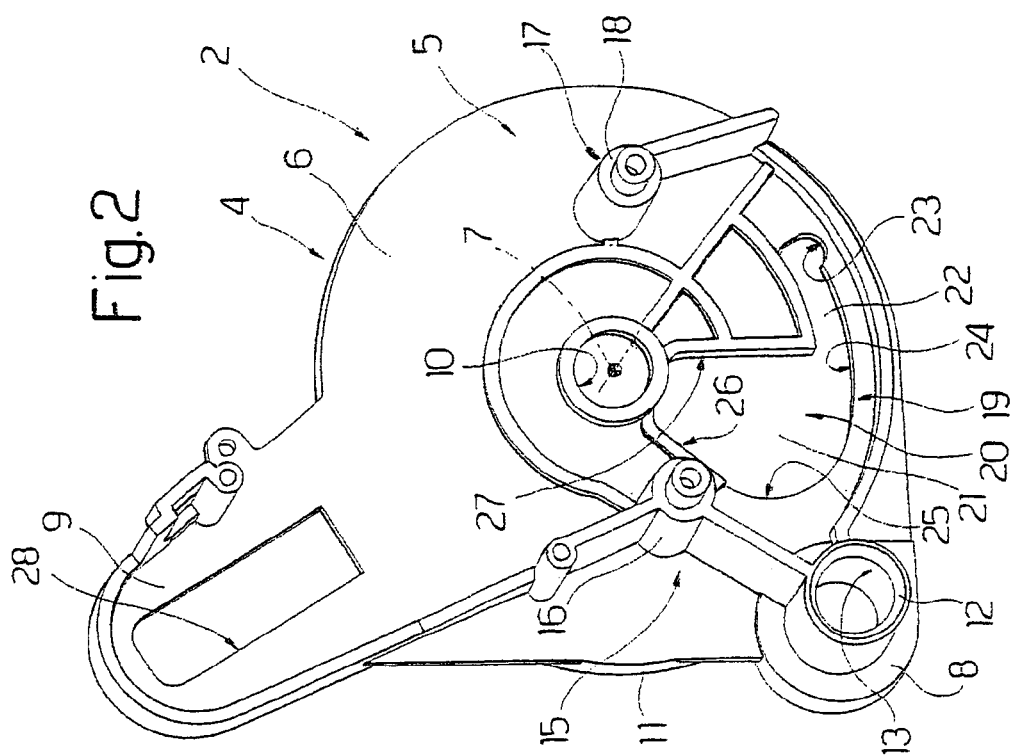

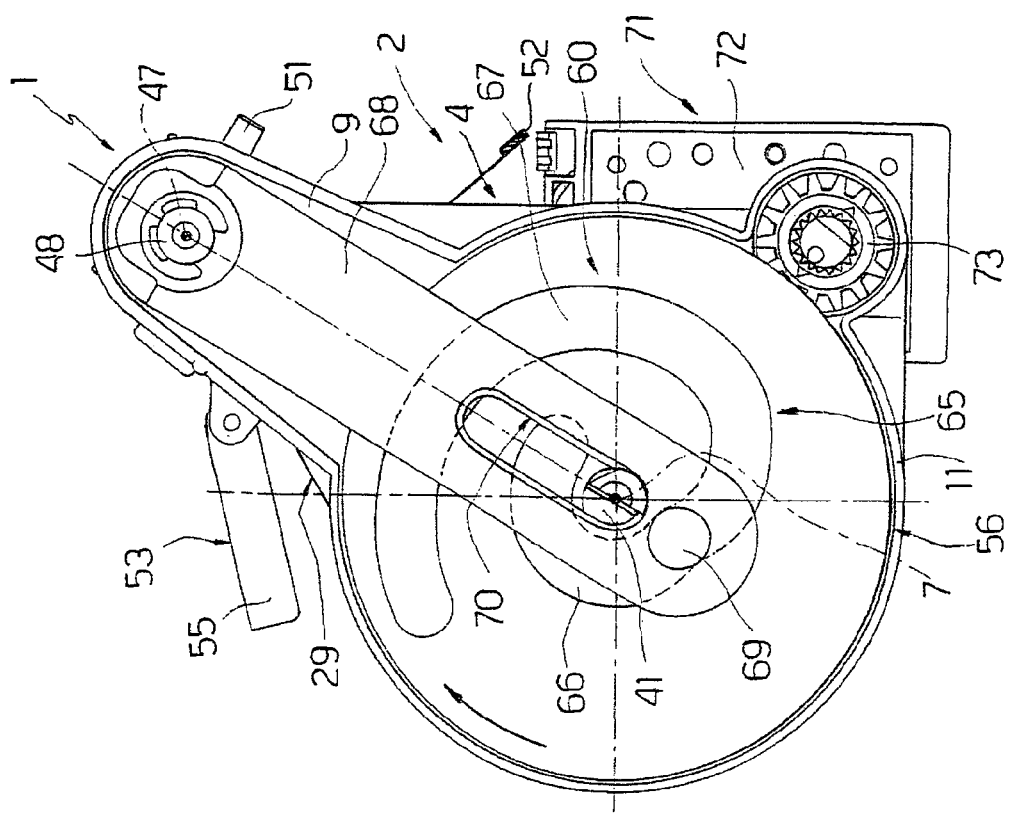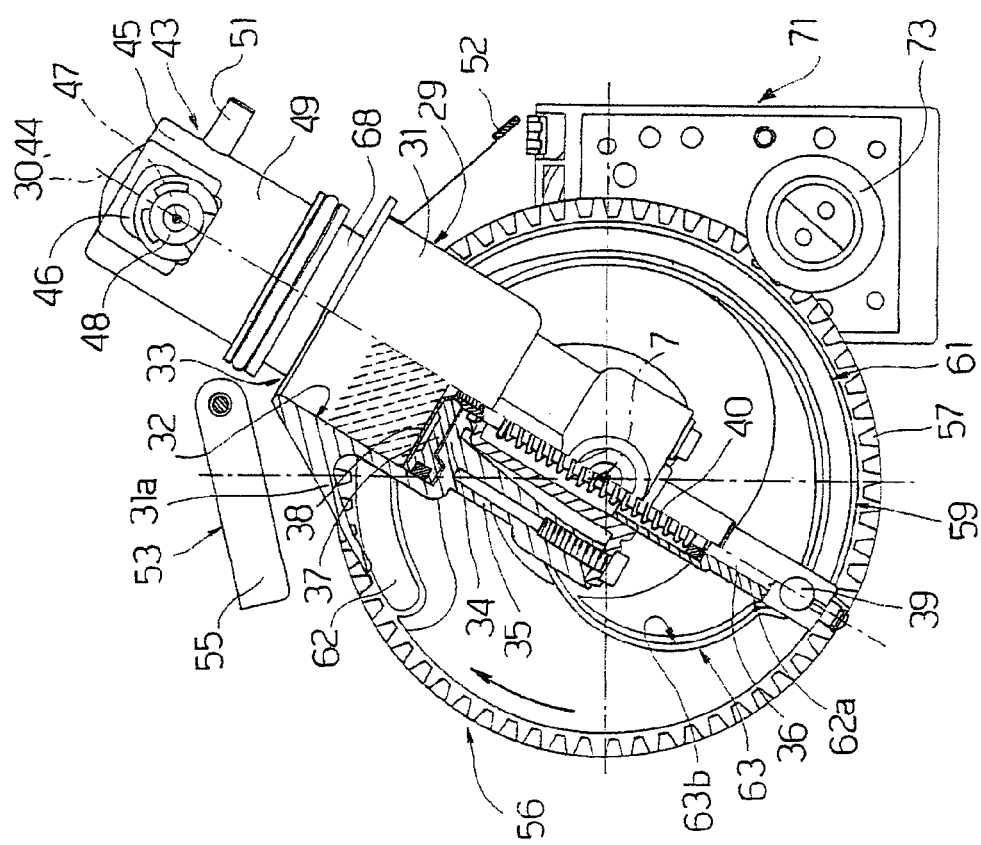

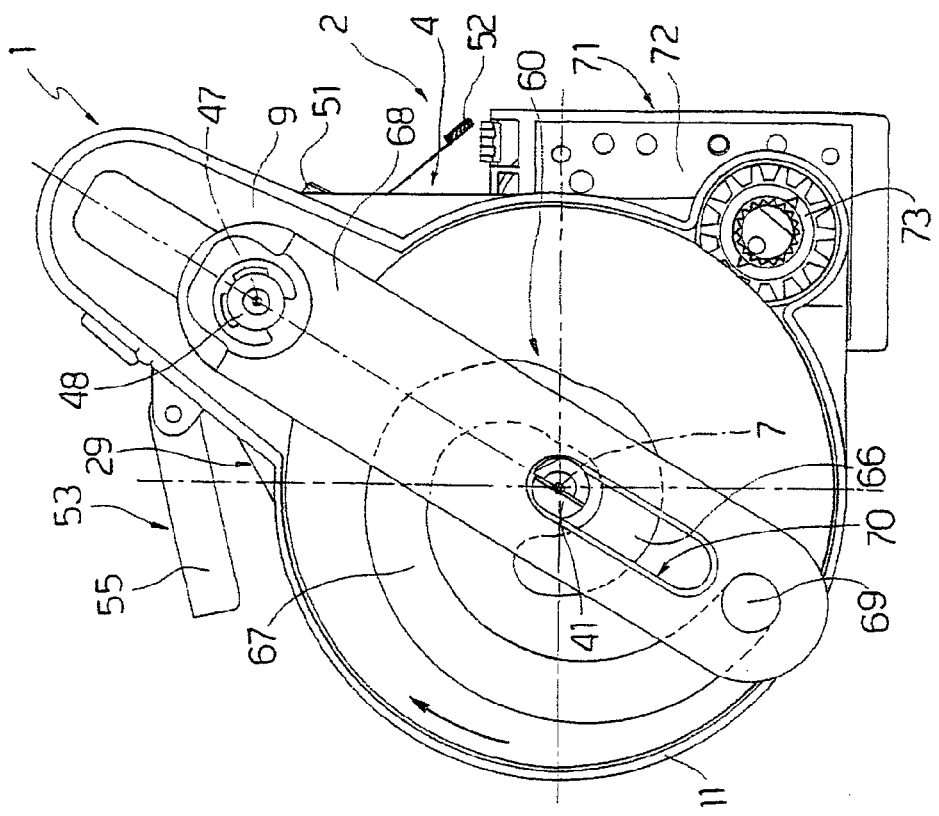
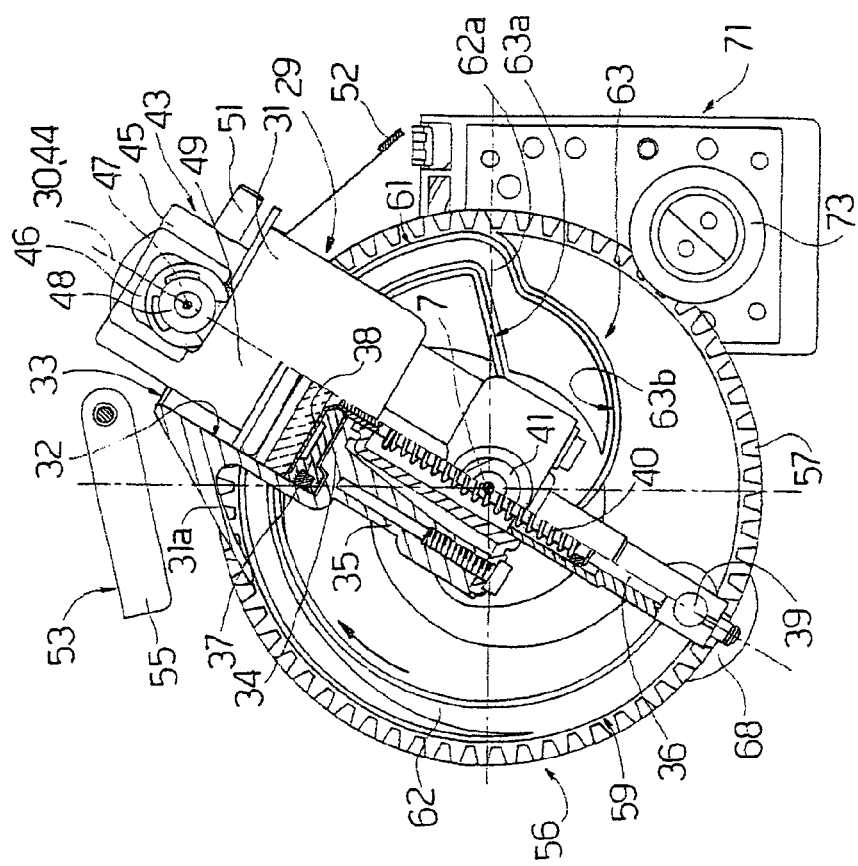

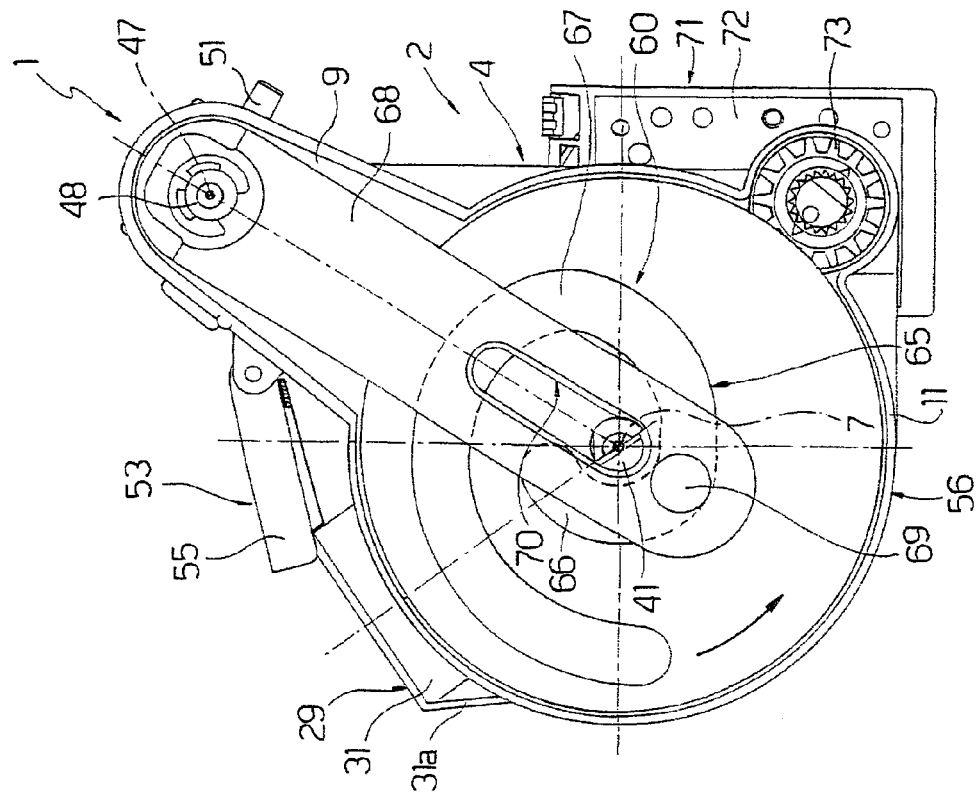
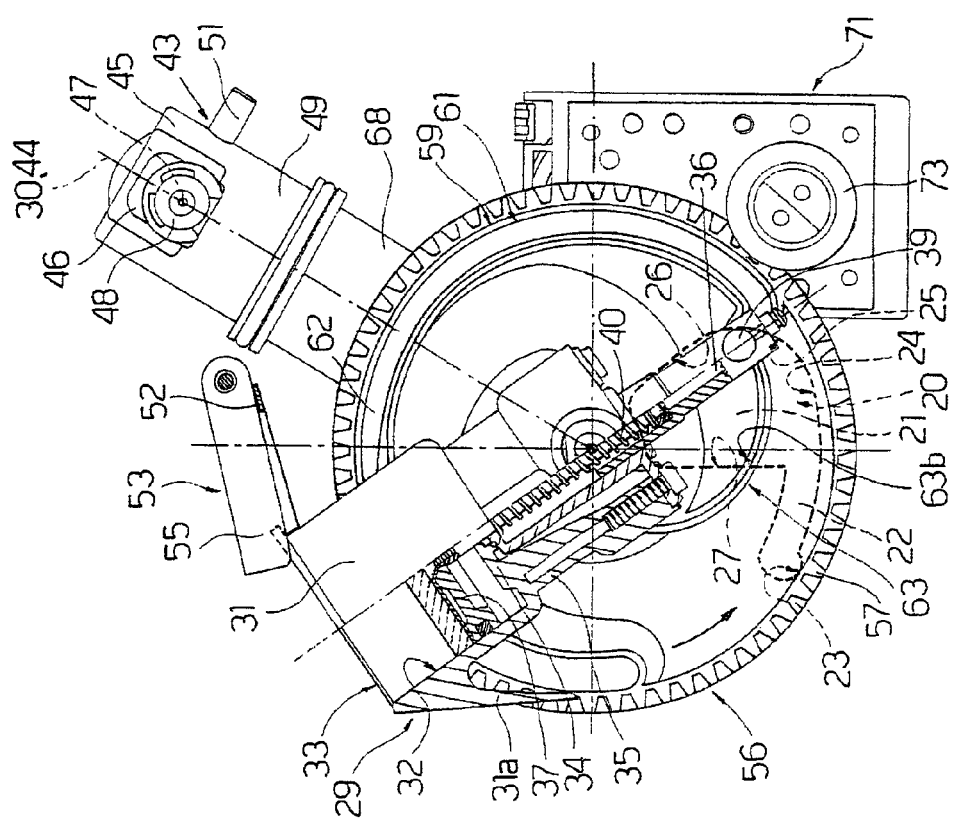
Fig.4D
Fig.5D

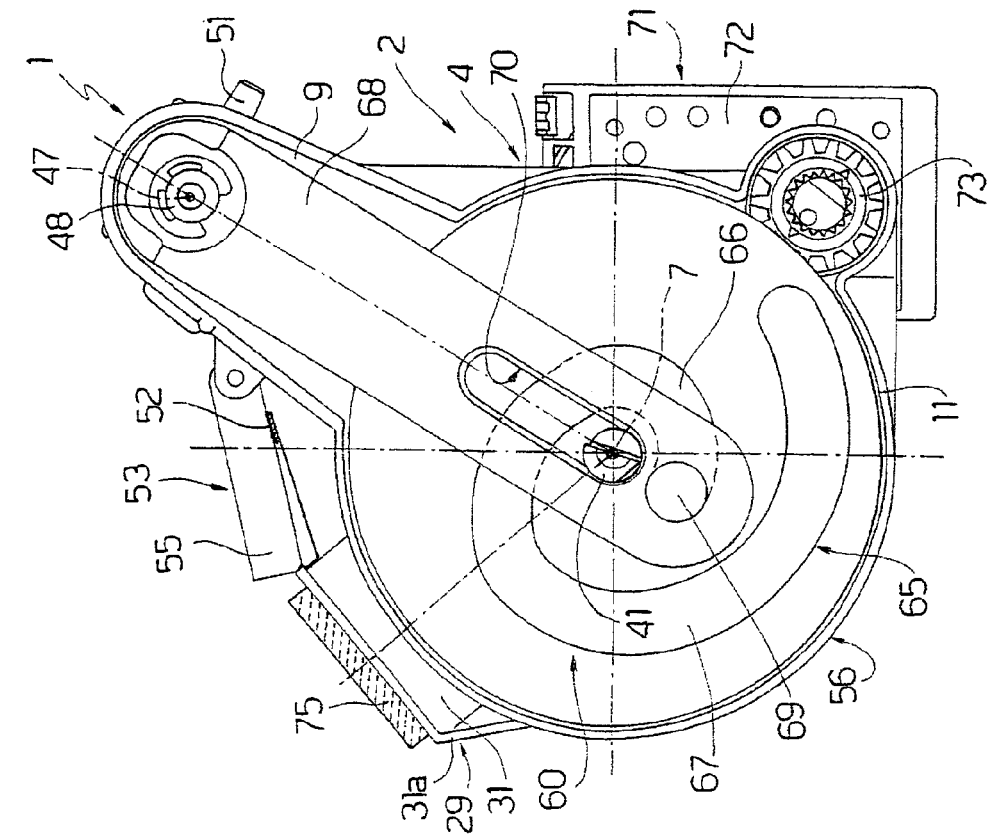

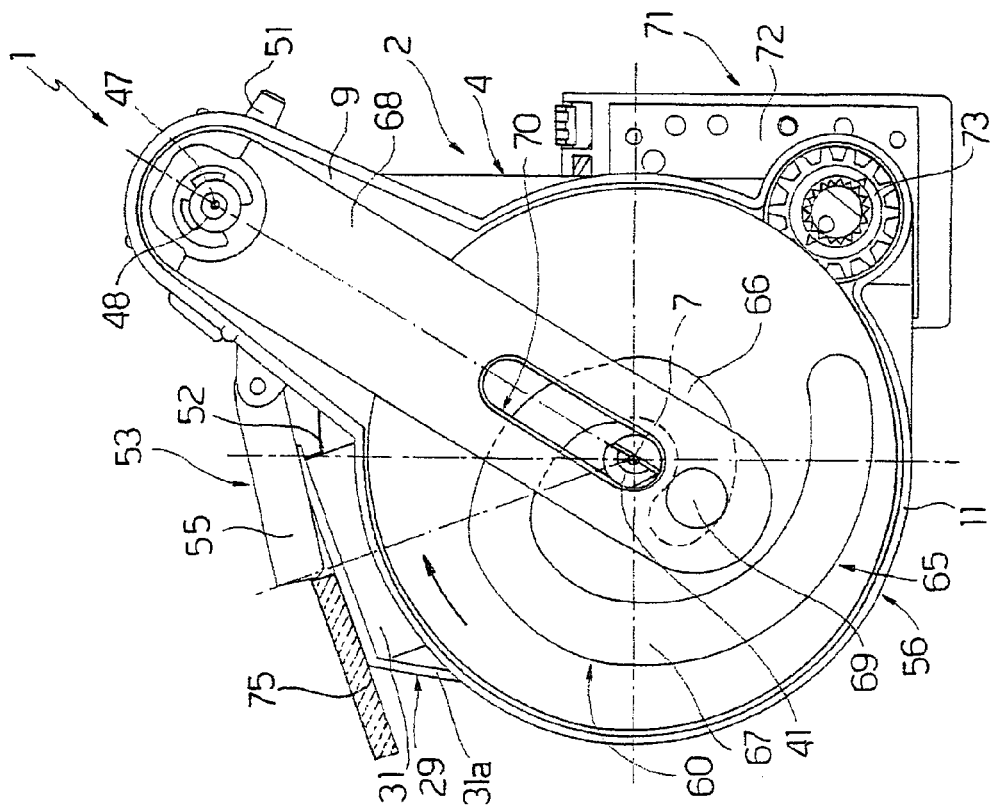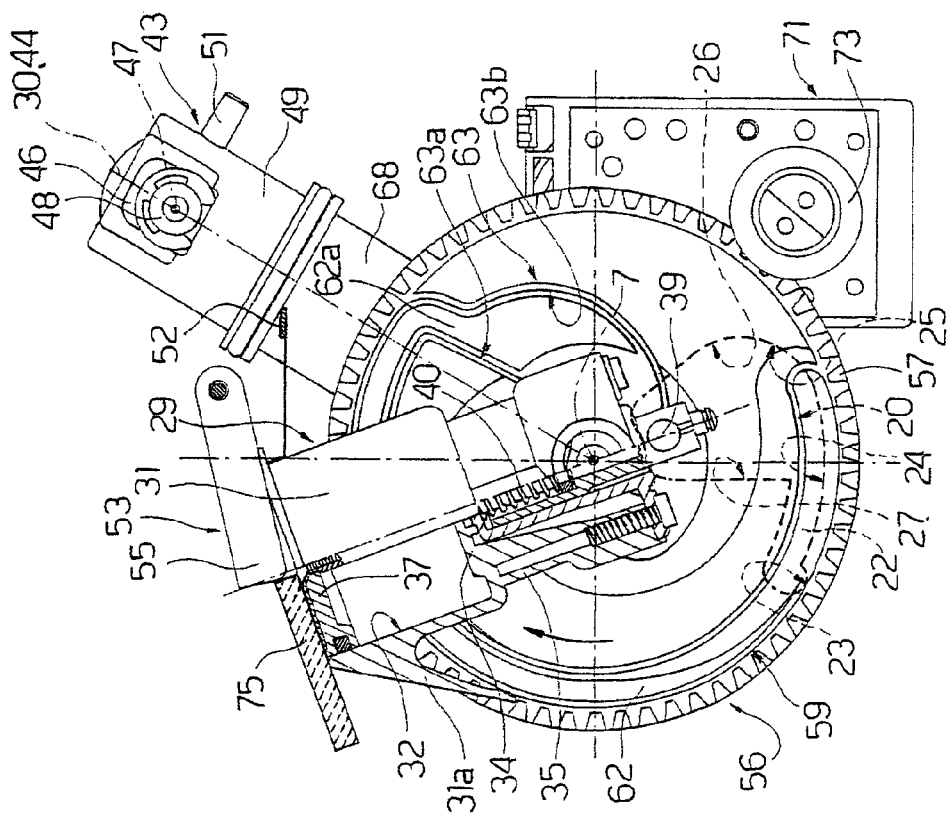

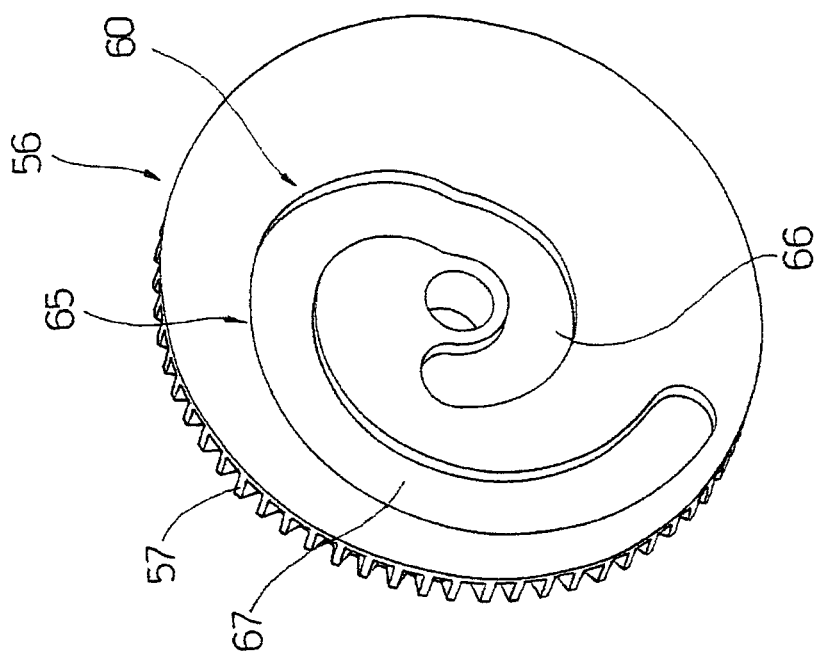
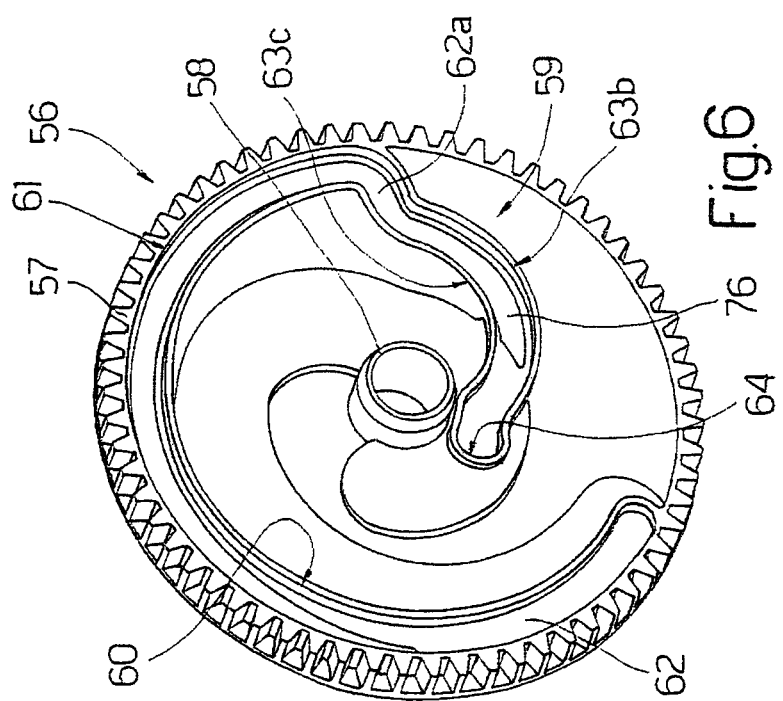

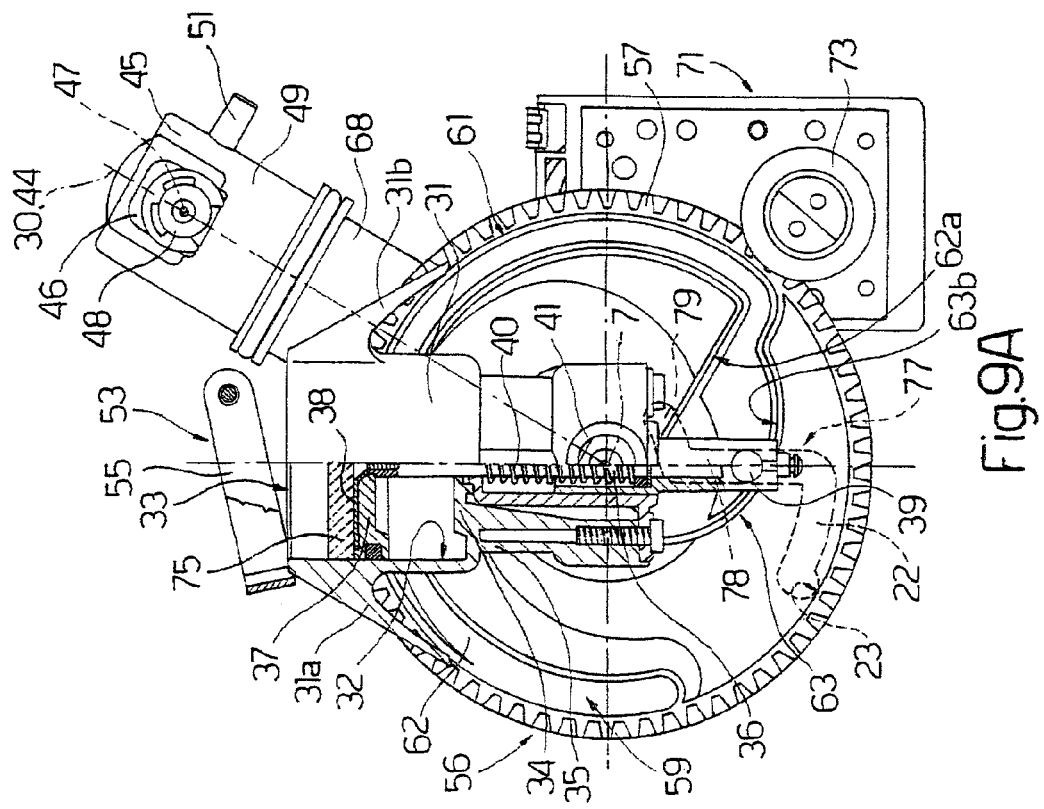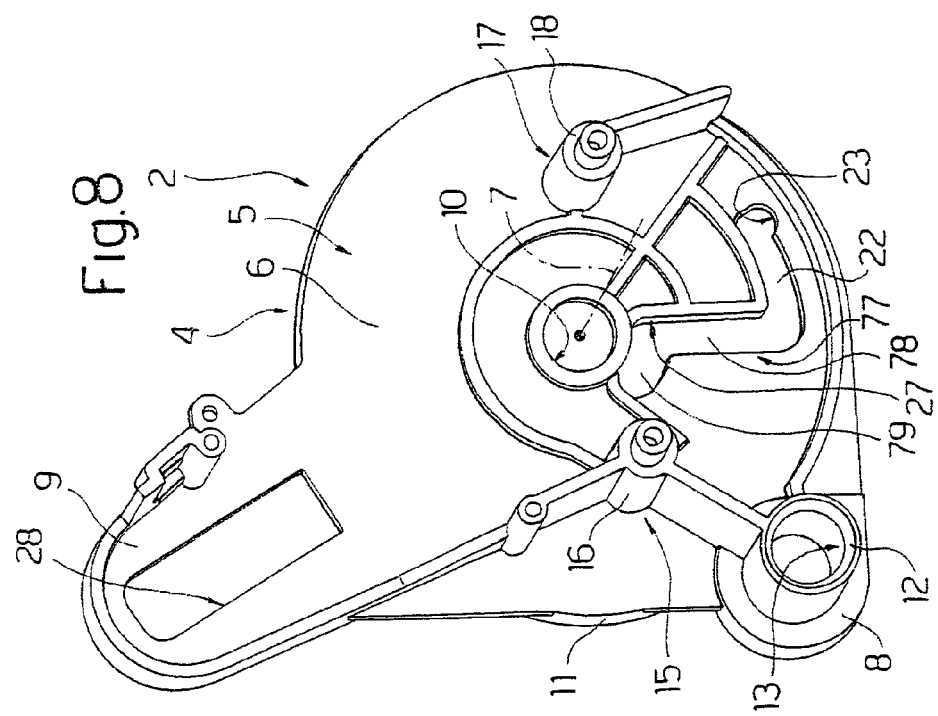

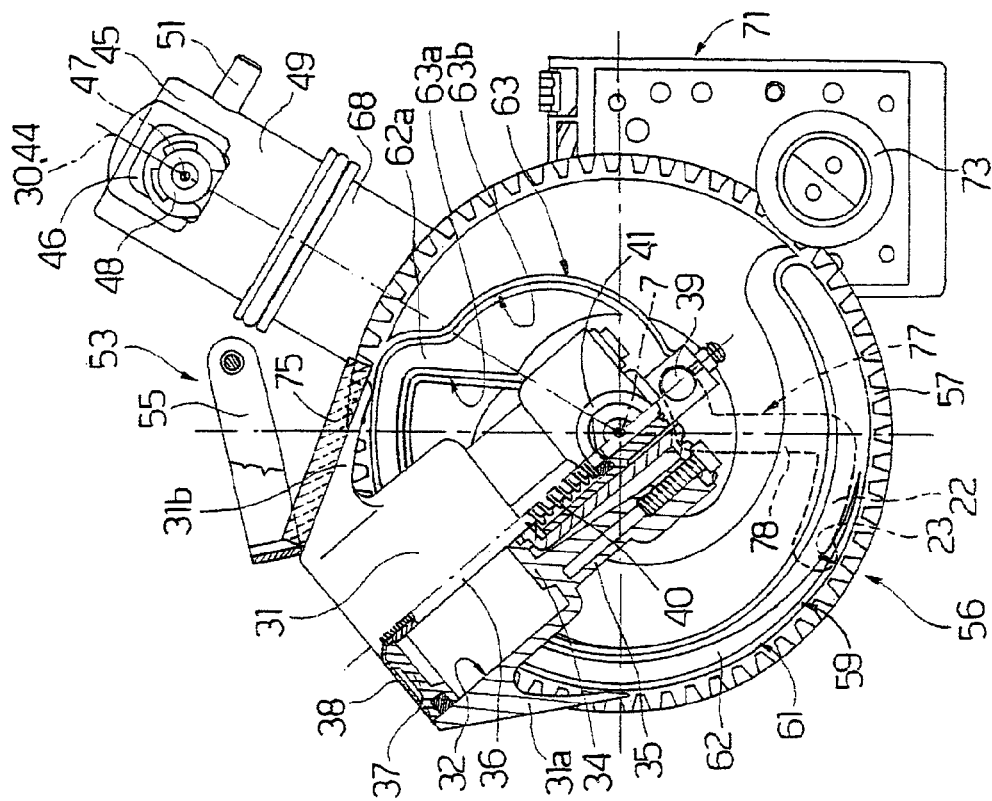
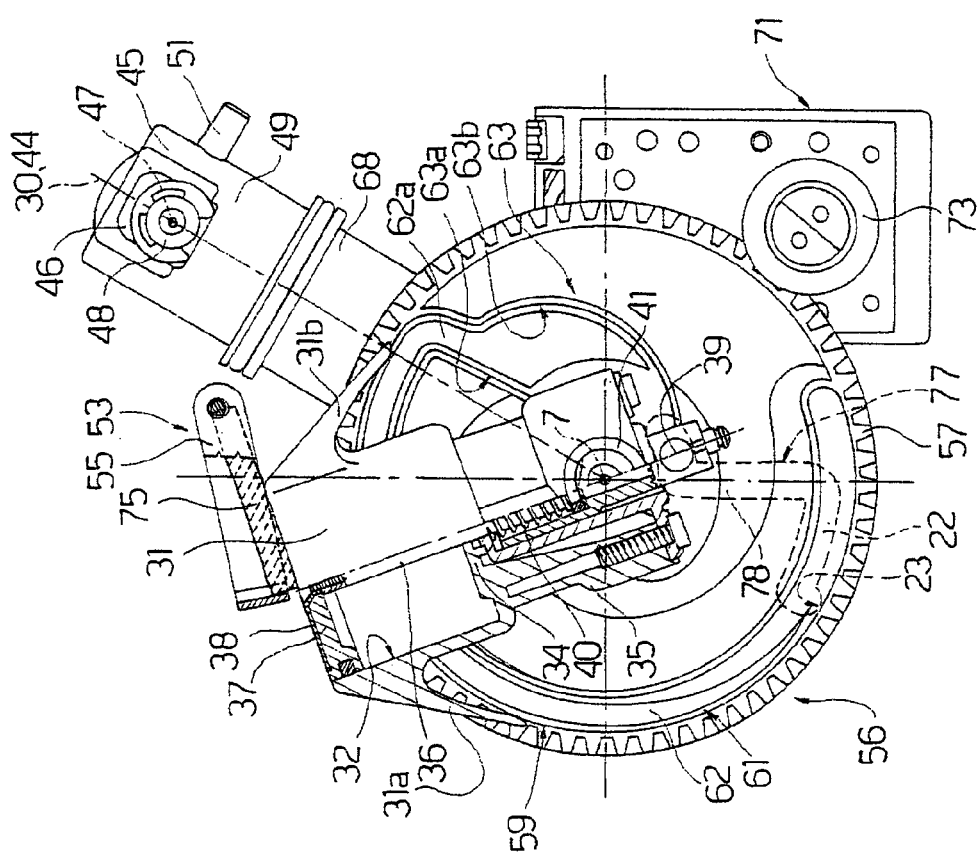
Fig.9C
Fig.9B

BREWING APPARATUS

TECHNICAL FIELD

The present invention relates to a brewing apparatus that may be used in brewed beverage, in particular espresso coffee, vending machines.

BACKGROUND ART

The brewing apparatuses commonly used at present in beverage vending machines normally comprise a brewing chamber movable between a first position, in which a brewing material can be loaded through an open end of the brewing chamber, and a second position, in which a first so-called pressure piston can be inserted inside the brewing chamber through its open end to compress the brewing material into a cake. A second so-called ejector piston, opposite the first piston and fitted with a filter, is located at the bottom of the brewing chamber, and slides inside the brewing chamber to eject the cake once brewing is completed.

A brewing apparatus of this type is described, for example, in EP 1 306 041, in which the second piston and movement of the brewing chamber are controlled by a disk with a cam on each face; and the first piston, which is only inserted inside the brewing chamber at the brewing stage, is controlled by a connecting rod-crank mechanism.

A drawback of this type of brewing apparatus, and all other similar types, in which the first piston is controlled by a connecting rod-crank mechanism, lies in the mechanism not only being bulky, particularly in the height direction of the apparatus, but also having a given bottom dead centre position which, if not reached, e.g. because of too much material inside the brewing chamber, prevents operation of the brewing apparatus.

In other words, known brewing apparatuses of this type have the major drawback of allowing no variation in the volume of the brewing chamber to brew different amounts of material, thus preventing use of a single brewing apparatus in vending machines producing different types of beverages.

Brewing apparatuses, such as the one described in EP 1 306 041, are also known which comprise a mechanism for positive control of both the oscillating movement of the brewing chamber and the up and down movement of the second piston; the term "positive control" being used here in the sense of a drive member controlling the movement of a driven member and all its physical parameters, such as speed, acceleration and trajectory.

Mechanisms of, this type, normally cam-controlled, are extremely complicated, by comprising one or more cam followers with members for transmitting motion to respective driven members. So much so that they may result in jamming and/or lack of coordination of the movements controlled by the mechanisms.

DISCLOSURE OF INVENTION

It is an object of the present invention to provide a brewing apparatus that is cheap and easy to produce and designed to eliminate the aforementioned drawbacks.

According to the present invention, there is provided a brewing apparatus as claimed in claim 1 and preferably in any one of the following Claims depending directly or indirectly on claim 1.

BRIEF DESCRIPTION OF THE DRAWINGS

A number of non-limiting embodiments of the present invention will be described by way of example with reference to the accompanying drawings, in which:

FIG. 2 shows an inside view in perspective of a first detail of FIG. 1;

FIG. 3 shows an inside view in perspective of a second detail of FIG. 1;

FIGS. 4A to 4G show inside views of the FIGS. 2 and 3 details as a whole in respective operating positions;

FIGS. 5A to 5G show outside views of the FIGS. 2 and 3 details as a whole in respective operating positions corresponding to those in FIGS. 4A to 4G;

FIGS. 6 and 7 show respective inside and outside views in perspective of a variation of the FIG. 3 detail;

FIG. 8 shows an inside view in perspective of a variation of the FIG. 2 detail;

FIGS. 9A to 9C show inside views of the FIGS. 8 and 3 details as a whole in respective operating positions.

BEST MODE FOR CARRYING OUT THE INVENTION

In the above brief description of the drawings and the following description of the embodiments illustrated of the brewing apparatus according to the present invention, the terms "front" and "rear" are used purely for the sake of simplicity, in that the brewing apparatus may be oriented anyway.

Figure 1:
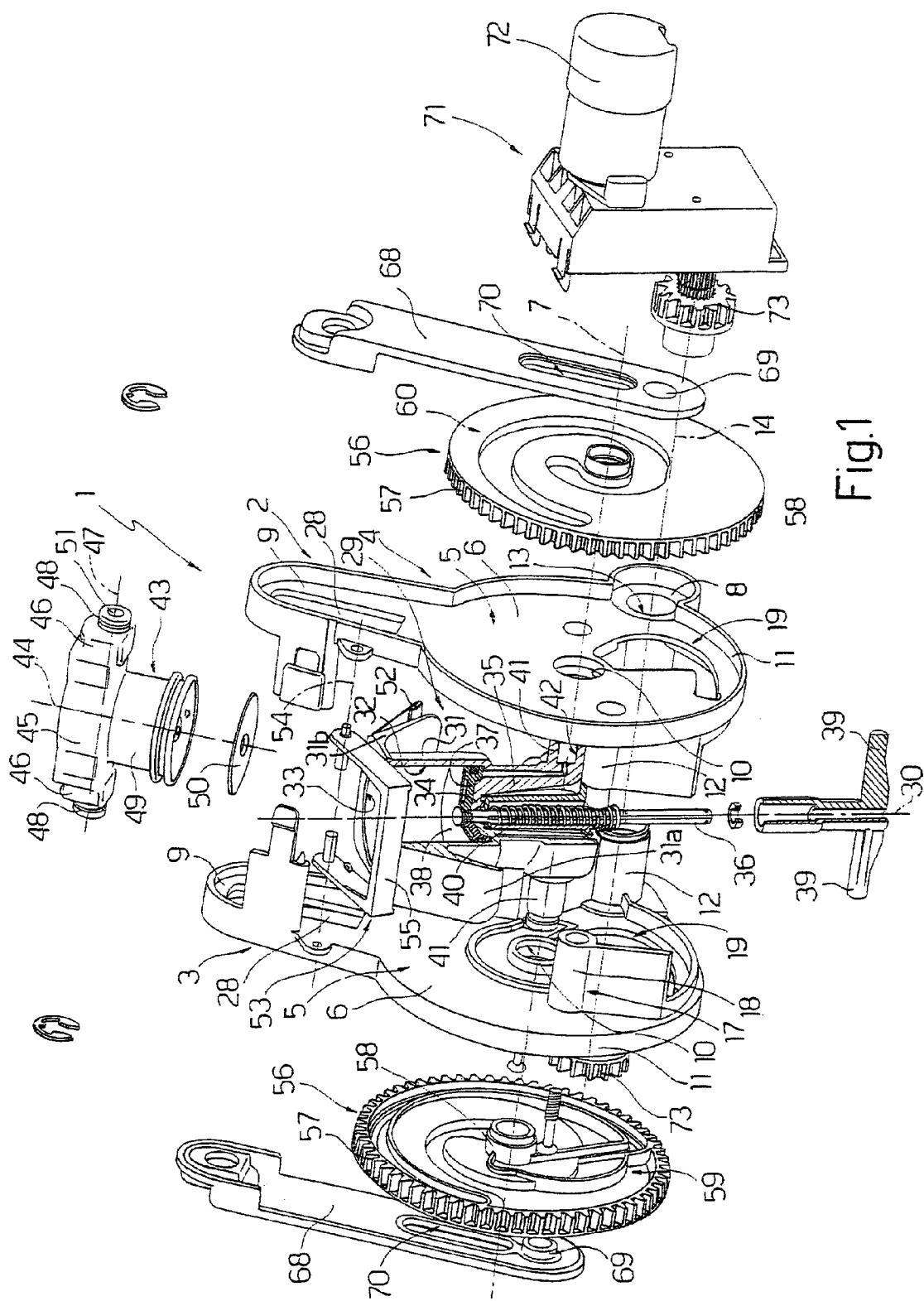
FIG. 1 shows an exploded rear view in perspective a preferred embodiment of the brewing apparatus according to the present invention.

Number 1 in FIG. 1 indicates as a whole a brewing apparatus forming part of a brewed beverage vending machine. Brewing apparatus 1 comprises a frame 2 defined by two specular, facing shoulders 3 and 4, only one of which will therefore be described below whenever possible.

As shown in FIG. 2 relative to shoulder 4, each shoulder 3, 4 comprises a plate 5 in turn comprising a circular portion 6 having an axis 7 and, at the front, a circular bottom radial appendix 8 and an elongated top radial appendix 9. Plate 5 has a through hole 10 coaxial with axis 7; an outer surface with a raised rib 11 running along the whole length of its periphery; and an inner surface facing the other plate 5, and from which a tubular spacer 12 projects perpendicularly from plate 5, and is connected to the free end of the other tubular spacer 12 to form a conduit 13, which terminates outside and is coaxial with an axis 14 (FIG. 1) parallel to axis 7 and coaxial with appendixes 8. A front spacer 15 and a rear spacer 17 project from the inner surface of plate 5; front spacer 15 is integral with tubular spacer and comprises two plates perpendicular to and integral with plate 5, and projecting radially from a central tubular body 16 parallel to axis 7 and connected to the other tubular body 16 by an axial pin; and rear spacer 17 is located on the opposite side of hole 10 to spacer 15, and comprises a tubular body 18 which is parallel to axis 7, is connected to the other tubular body 18 by an axial pin, and has a radial plate perpendicular to and integral with plate 5.

As shown more clearly in FIG. 2, each shoulder 3, incorporates a control device 19 in the form of a fixed cam device defined on each plate 5 by an L-shaped window 20, a top branch 21 of which, extending radially with respect to axis 7, is located between spacers 15 and 17 and is substantially trapezium-shaped, and a bottom branch 22 of which extends rearwards from top branch 21 and is in the form of curved slot extending about axis 7 and terminating with a radial recess 23 at its closed rear end opposite the end communicating with top branch 21. In other words, window 20 has a radially outer periphery defined by a substantially arc-shaped edge 24, which is coaxial with axis 7, extends along bottom branch 22 and along the bottom edge of top branch 21 from recess 23, and is connected by a curved edge 25 to a front radial edge 26 of top branch 21. A further curved edge, close to and about hole 10 and at the tip of top branch 21, connects edge 26 to a further radial edge 27, which defines the rear of top branch 21, and is in turn defined at its radially outer end by bottom branch 22.

Each plate 5 also has a radial slot 28 (with respect to axis 7) extending along relative top radial appendix 9.

As shown in FIG. 1, when joined by spacers 12, 15 and 17, shoulders 3 and 4 define a gap fitted inside with an elongated brewing body 29, which has a longitudinal axis 30 perpendicular to axis 7, and comprises a top portion defined by a cylindrical cup-shaped body 31 having a rear tile 31a. Cup-shaped body 31 is coaxial with axis 30, internally defines a brewing chamber 32 communicating with the outside through a top loading-unloading opening 33, and is closed at the bottom by a bottom wall 34. Brewing body 29 also comprises a bottom portion defined by a cylindrical tubular body 35 coaxial with cup-shaped body 31 and extending downwards from bottom wall 34. Through an axial hole formed through bottom wall 34, tubular body 35 is fitted inside in sliding manner with the rod 36 of a so-called ejector piston 37, which is defined by a plate mounted to slide axially inside brewing chamber 32 and connected to a filter 38. The bottom end of rod 36, opposite the end connected to piston 37, is fitted with a T-shaped member having, on its bottom end, two diametrically opposite, radial arms, each defining a cam follower 39 and engaging relative window 20 of control device 19. Piston 37 is normally maintained in a lowered rest position (FIG. 1), contacting bottom wall 34, by a spring 40 fitted to rod 36 and retained between bottom wall 34 and said T-shaped member.

Two diametrically opposite, tubular pins 41 project radially from tubular body 35, are each parallel to a relative cam follower 39, and each engage in rotary manner a relative hole 10 to support brewing body 29 on frame 2 and allow brewing body 29 to oscillate about axis 7 and with respect to frame 2. One of tubular pins 41 is closed, while the other defines a brewing water inlet and communicates with the inside of brewing chamber 32 along a conduit 42 extending axially inside tubular body 35 and through bottom wall 34.

The gap between shoulders 3 and 4 is also fitted inside with a further piston 43, or so-called compression piston, having a longitudinal axis 44 and comprising an annular connecting end 45 coaxial with axis 44 and having two diametrically opposite, radial appendixes 46, which are coaxial with each other and with an axis 47 parallel to axis 7, and each engage relative slot 28 in transversely sliding, angularly fixed manner. On its free end, each radial appendix 46 has a pin 48 coaxial with axis 47 and for the purpose explained below. Piston 43 also comprises a cylindrical body 49, which projects downwards from annular connecting end 45 and is movable in use, along axis 44, between a lowered position, in which cylindrical body 49 engages cup-shaped body 31 in sliding and fluidtight manner to close brewing chamber 32, and a raised position, in which cylindrical body 49 is fully expelled from and located a given height above brewing chamber 32. At the end facing cup-shaped body 31, cylindrical body 49 has a chamber closed at the bottom by a filter 50 and communicating with the outside along a conduit 51 extending along cylindrical body 49 and through one of radial appendixes 46 and relative pin 48 to permit beverage outflow from brewing chamber 32.

The gap between shoulders 3 and 4 is also fitted inside with a cleaning member 52 movable with brewing body 29 beneath piston 23 to keep filter 50 clean; and a passive doctor device 53 for unloading the used-up material expelled by piston 37 from brewing chamber 32.

As shown in FIG. 1, doctor device 53 is U-shaped, is hinged to the rear of top radial appendixes 9 of shoulders 3 and 4 to oscillate about an axis 54 parallel to axis 7, and comprises two lateral arms fitted to respective opposite ends of a doctor 55 located along the path travelled by the top end of cup-shaped body 31 as it oscillates about axis 7.

Figures 4A, 5A:
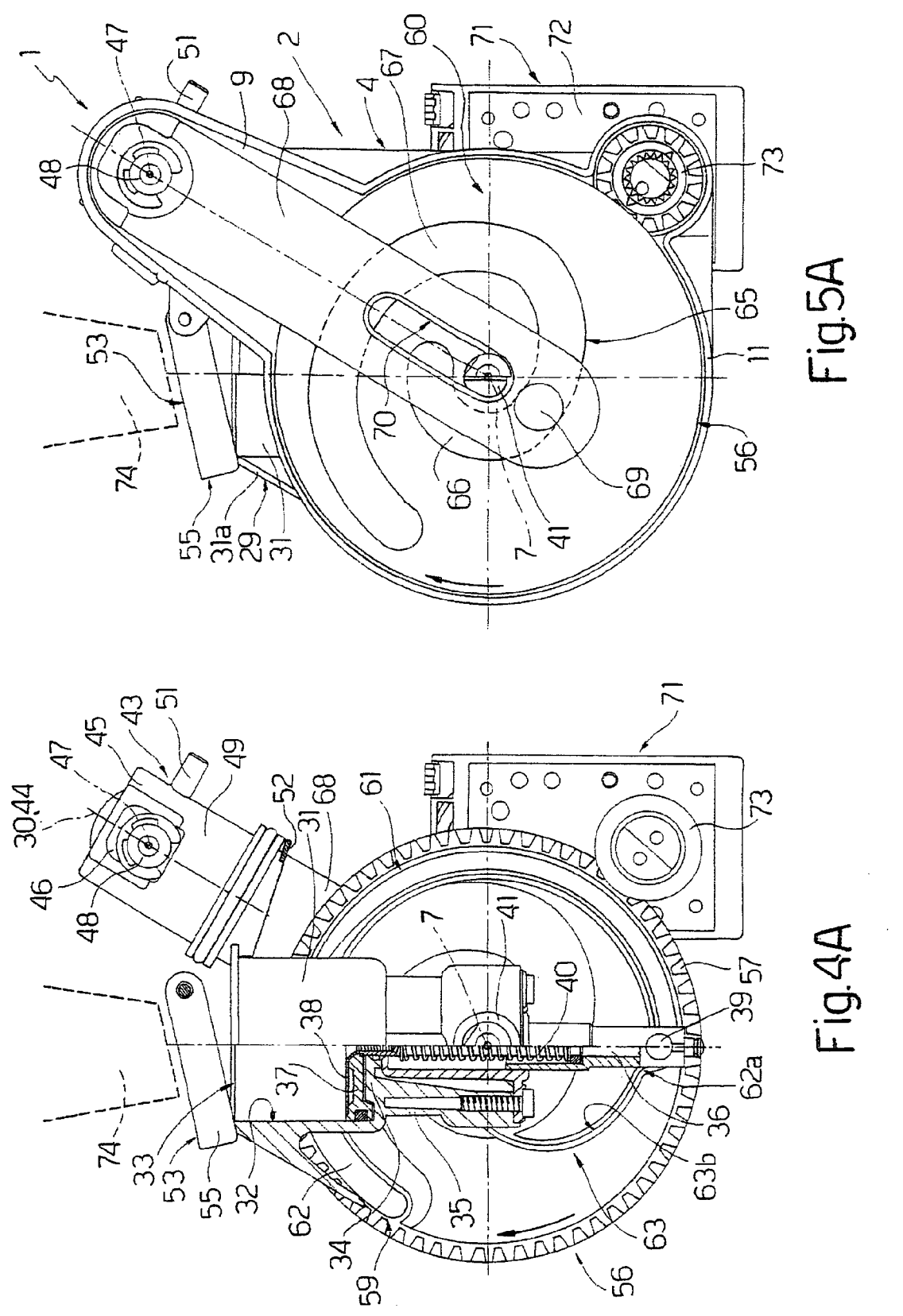
Figure 5G:
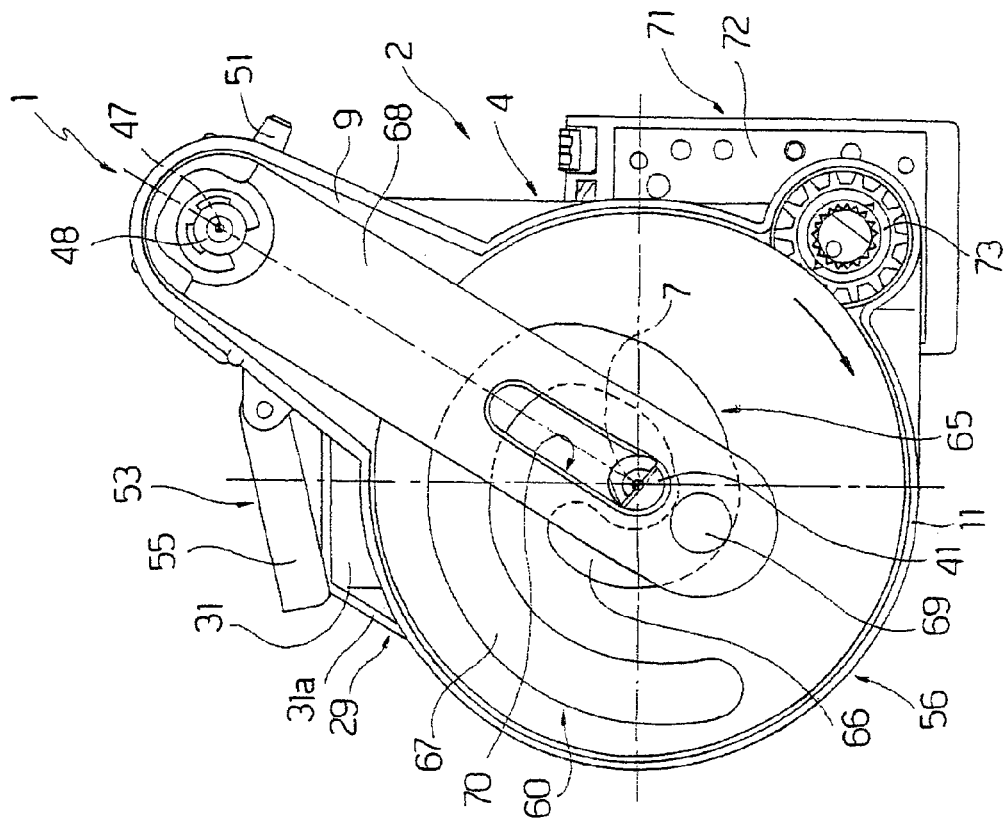

Rib 11 on each shoulder 3, 4 defines, about circular portion 6 of relative plate 5, a seat for an oscillating control unit comprising a disk 56, which is coaxial with axis 7 and has external teeth 57, and tubular central hub 58 engaging relative hole 10 and the two tubular pins 41 in rotary manner. Disk 56 has an inner surface (FIG. 3) designed to define a control device 59 in the form of a movable cam device for controlling oscillation of brewing body 29 about axis 7, and for also controlling, together with control device 19, the position of piston 37 along brewing chamber 32, as piston 37 moves towards opening 33. Disk 56 also has an outer surface (FIG. 5A) designed to define a control device 60 in the form of a movable cam device for controlling the axial movement of piston 43.

As shown in FIG. 3, movable cam control device 59 is defined, on each disk 56, by a track 61 formed on the inner surface of disk 56 and engaged by relative cam follower 39 (FIG. 1) through relative window 20. Track 61 comprises a circumferential branch 62 extending about axis 7 and along the periphery of the inner surface of disk 56; and a substantially radial branch 63 connected to one end of branch 62 by a radial portion 62a of branch 62, and comprising a chamber, which is bounded by a substantially radial inner edge 63a extending up to hub 58 and connected to an inner edge of branch 62, by a curved outer edge 63b connected to an outer edge of portion 62a of branch 62, and by a radially inner edge extending from hub 58 and connected to outer edge 63b to form a recess 64 located close to hub 58 and for receiving and retaining relative cam follower 39.

As shown, for example, in FIG. 5A, control device 60 is defined, on each disk 56, by a track 65 formed on the outer surface of disk 56, extending about axis 7, and comprising a circumferential branch 66 extending about axis 7; and a spiral branch 67, a radially inner end of which is connected to one end of branch 66.

As shown in FIG. 1 and, for example, FIG. 5A, control device 60 on each disk 56 is connected to piston 43 by a respective radial rod 68, which is hinged at the top end to relative pin 48, is fitted, close to its bottom end, with a cam follower 69 engaging relative track 65, and has an axial slot 70 engaged in transversely sliding manner by relative hub 58 and relative tubular pin 41.

Brewing apparatus 1 also comprises a drive 71. In the example shown, drive 71 comprises a reversible motor having an output shaft connected angularly to a pinion 73, which is coaxial with axis 14, is housed inside a seat defined by rib 11 on relative bottom radial appendix 8, meshes with relative teeth 57, and is integral, via conduit 13, with a like pinion 73 on the other plate 5.

Figure 4G:
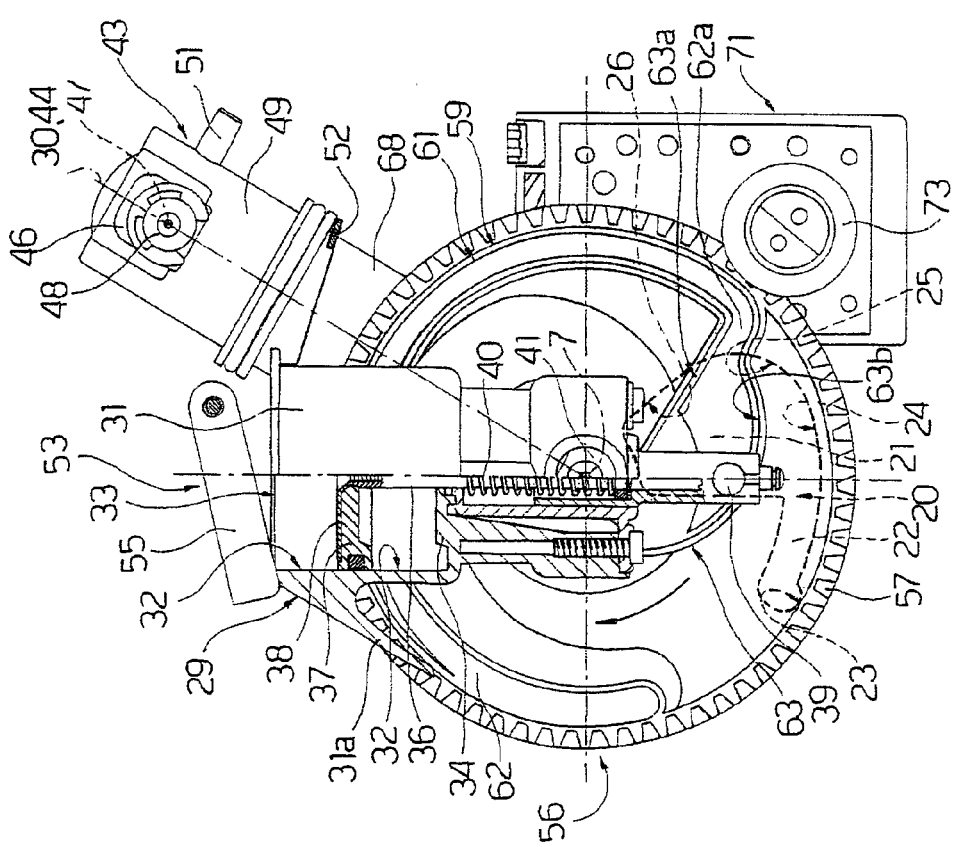

Operation of brewing apparatus 1 will now be described with reference to FIGS. 4 and 5, and as of the operating position shown in FIGS. 4A and 5A, which is a loading position in which axis 30 is substantially vertical, opening 33 of cup-shaped body 31 is located between the arms of doctor device 53 and directly beneath a hopper 74, piston 37 is in the lowered rest position contacting bottom wall 34 of brewing chamber 32, and piston 43 is in a raised rest position.

When brewing apparatus 1 is in the above loading position, each cam follower 39 is maintained by spring 40 in a position (not shown) contacting an intermediate point of bottom branch 22 of relative window 20 of control device 19, and partly engages (FIG. 4A) portion 62a of branch 62 of relative track 61 of control device 59. At the same time, each cam follower 69 is located, along relative track 65 of control device 60, slightly upstream from the connecting point between circumferential branch 66 and spiral branch 67.

Once the brewing material is loaded inside brewing chamber 32, motor 72 is started to rotate disks 56 clockwise in FIGS. 4A and 5A. Since each cam follower 39 (FIG. 4A) partly engages portion 62a of branch 62 of relative track 61, the rotating disks 56 also take along cam followers 39 to rotate brewing body 29 clockwise and align axis 30 with axis 44 in a brewing position (FIGS. 4B and 5B), in which opening 33 of the brewing chamber is aligned with and faces piston 43. As a result of the above rotation, each cam follower 69 moves up to the connecting point between circumferential branch 66 and spiral branch 67 to keep piston 43 in the raised position, and each cam follower 39 moves along relative edge 24 of control device 19 to engage relative recess 23 (position not shown). Since the radius of the outer edge of circumferential branch 62 of track 61 is slightly greater than that of edge 24 of window 20 and equal to the distance between the bottom of recess 23 and axis 7, the radial movement of cam follower 39 to engage recess 23 disengages cam follower 39 from portion 62a of branch 62 of relative track 61 of control device 59.

At this point, further clockwise rotation of disks produces no rotation of brewing body 29 and no movement of piston 37, on account of cam followers 39 being stationary inside relative recesses 23, and only produces a relative movement (FIG. 4C) of disks 56 with respect to cam followers 39, each of which moves along circumferential branch 62 of relative track 61 of control device 59 up to the closed end of circumferential branch 62. At the same time (FIG. 5C), each cam follower 69 moves along spiral branch 67 of relative track 65 of control device 60, so that relative rod 68 moves radially downwards, thus moving piston 43 downwards along axis 44 to engage brewing chamber 32 in fluidtight manner and compress the brewing material in the brewing chamber into a cake 75 contacting filter 38.

As shown in FIGS. 4C and 5C, the clockwise rotation described above and the resulting downward movement of piston 43 theoretically stop as cam followers 39 reach the closed ends of relative circumferential branches 62, and cam followers 69 simultaneously reach the closed ends of relative spiral branches 67, thus producing an increase in current draw, and programmed stoppage, of motor 72. In actual fact, however, the above result depends on the amount of brewing material inside brewing chamber 32. That is, the greater the amount of brewing material, the sooner the current draw of the motor increases, and the sooner motor 72 is stopped. As a result, different amounts can be loaded, depending on the type of brewing material, which is absolutely impossible in the event piston 43 is operated by a connecting rod-crank transmission.

When motor 72 is turned off, hot water is fed into the brewing chamber along conduit 42 and through cake 75 compressed between the two filters 38 and 50 to produce a brewed beverage which flows out along conduit 51.

At this point, the hot water supply is cut off and motor 72 started again to rotate disks 56 anticlockwise.

Over a first part of the anticlockwise rotation of disks 56, cam followers 69 reverse along relative spiral branches 67 to fully expel piston 43 from brewing chamber 32; and, at the same time, cam followers 39, stationary inside relative recesses 23, travel along the whole of relative circumferential branches 62 up to relative portions 62a to restore brewing apparatus 1 to the FIG. 4B and 5B position.

Over a second part of the anticlockwise rotation of disks 56, cam followers 69 move along circumferential branches 66 of tracks 65, keeping piston 43 in the raised position; and cam followers 39, engaging relative portions 62a, disengage relative recesses 23 and, still engaging relative portions 62a, move along edges 24 up to curved edges 25 of windows 20 of control devices 19. This movement of cam followers 39 rotates brewing body 29 anticlockwise about axis 7, so that cup-shaped body 31 is restored to the FIG. 4A loading position, and continues into a position downstream from doctor 55.

At this point, control devices 19 and control devices 59 cooperate to control the position of piston 37 along brewing chamber 32.

That is, over a third part of the anticlockwise rotation of disks 56, cam followers 69 continue moving along circumferential branches 66 of tracks 65 to keep piston 43 in the raised position; and cam followers 39, pushed by disks 56 along curved edges 25 of relative windows 20, disengage relative portions 62a, and move towards axis 7 (FIGS. 4D and 5D) along relative edges 63b up to relative recesses 64 (FIGS. 4E and 5E) to arrest anticlockwise rotation of disks 56. This movement moves piston 37 into a fully raised position (FIGS. 4E and 5E), in which filter 38 is on a level with opening 33, and cake 75 is pushed out of brewing chamber 32 into a position facing doctor 55.

When piston 37 is in the fully raised position, cam followers 39, engaging relative recesses 64, are arrested against front radial edges 26 of windows 20, and cam followers 69 reach the closed ends of relative circumferential branches 66, thus stopping and reversing motor 72.

When motor 72 again rotates disks 56 clockwise, cam followers 39, still engaging relative recesses 64 move together with disks 56 to keep piston 37 in the fully raised position (FIGS. 4F and 5F) and to more cup-shaped body 31 beneath doctor 55 into the loading position and so remove cake 75, which is unloaded onto tile 31a and drops to the rear of brewing apparatus 1 into a bin not shown. During this movement, cam followers 39, still engaging relative recesses 64, move towards rear radial edges 27 of windows 20. On contacting rear radial edges 27, cam followers 39 are disengaged from relative recesses 64 and moved (FIGS. 4G and 5G) by springs 40 along rear radial edges 27 of relative windows 20 and along edges 63b of radial branches 63 of tracks 62, so as to engage portions 62a on one side, and bottom branches 22 of windows 20 on the other. Which position corresponds to a return of brewing apparatus 1 to the loading position.

The FIGS. 6 and 7 variation is substantially identical to the FIG. 1-5 embodiment, the only difference being that, as opposed to comprising a chamber, radial branch 63 of track 61 of control device simply comprises a substantially radial, constant-section track 76 comprising an outer radial portion defined by portion 62a, a closed end defined by recess 64, and an intermediate portion bounded on one side by curved outer edge 63b, and on the other side by an inner edge 63c of the same shape as outer edge 63b.

This variation operates in substantially the same way as the FIG. 1-5 embodiment, except that the return movement of piston 37 is guided more accurately. In this case too, track 76 being substantially radial and so imparting no movement to relative cam follower 39 as disk 56 is rotated, piston 37 is restored to the lowered rest position solely by spring 40, as opposed to being guided positively by control device 56.

The FIG. 8 variation is substantially identical to the FIG. 1-5 embodiment, except that cup-shaped body 31 has a front tile 31b, and the L-shaped window 20 of control device 19 is replaced by a substantially Z-shaped window 77 comprising circumferential bottom branch 22 with recess 23; a radial branch 78 extending towards relative hole 10 and having an inner edge coinciding with radial edge 27 of window 20; and a radially inner, circumferential branch 79 extending about relative hole 10 and bounded, on the axis 7 side, by an edge substantially coinciding with the curved tip edge of top branch 21 of window 20.

In this variation, piston 37 does not move into the raised position as brewing chamber 32 moves from the brewing position and is arrested downstream from doctor 55, but much earlier, i.e. substantially in the loading position (FIG. 9A), in which opening 33 is located upstream from doctor 55 and between the arms of doctor device 53. Consequently, as opposed to being expelled, as before, as cup-shaped body 31, downstream from doctor 55, returns to the loading position, cake 75 is expelled as cup-shaped body 31 moves out of the brewing position, and before it passes doctor 55.

The expelled cake 75 is therefore intercepted by doctor 55 and unloaded onto front tile 31b, from which it is unloaded as cup-shaped body 31 returns into the loading position and the brewing position.

The invention claimed is:

1. A brewing apparatus comprising:
   a fixed axis;
   a fixed frame;
   a reversible drive;
   a number of movable driven members, all of the movable driven members coupled to the drive to oscillate about the fixed axis, to move radially with respect to the fixed axis, or combinations thereof, the movable driven members including:
      a first piston mounted for moving radially with respect to the fixed axis to eject a material to be brewed when brewed;
      a second piston mounted for moving radially with respect to the fixed axis to compress the material to be brewed before brewing;
      a first movable body comprising a hollow body defining a brewing chamber and fitted to the frame to perform an oscillating first movement with respect to the frame and about the fixed axis;
      a second movable body which is defined by said first piston and is fitted to the hollow body to perform the first movement with the first movable body, and to perform, with respect to the first movable body, a second movement along the brewing chamber and radially with respect to the fixed axis;
      a third movable body which is defined by said second piston and is fitted to the frame to perform a radial third movement with respect to the fixed axis, so as to be inserted into and expelled from the brewing chamber when the first movable body assumes a given position about the fixed axis; and
      a movable control unit comprising movable control means fitted to the frame to oscillate about the fixed axis; and
   fixed control means which cooperate with the movable control means to control the movements imparted by the drive to the other movable driven members.

2. The brewing apparatus as claimed in claim 1, wherein the fixed control means are formed on the frame.

3. The brewing apparatus as claimed in claim 1, wherein said fixed and movable control means are cam control means comprising track means all extending about the fixed axis and/or substantially radially with respect to the fixed axis.

4. The brewing apparatus as claimed in claim 1, wherein the movable control unit is interposed between the drive and the other movable driven members.

5. The brewing apparatus as claimed in claim 1, wherein the movable control unit is connected to the other movable driven members to impart the first and third movement, and cooperates with the fixed control means to impart part of the second movement to the second movable body.

6. The brewing apparatus as claimed in claim 1, and comprising elastic means to impart part of the second movement to the second movable body.

7. The brewing apparatus as claimed in claim 1, wherein elastic means are interposed between the first and second movable body; the first and third movable body are connected to the drive by the movable control unit to perform the first and third movement under control of the drive and the movable control unit; the second movable body is connected both to the drive by the movable control unit and to the fixed control means and elastic means to perform part of the second movement under control of the drive and under the combined control of the movable control unit and the fixed control means, and the rest of the second movement under control of the elastic means and the movable control unit.

8. The brewing apparatus as claimed in claim 1, wherein elastic means are interposed between the first and second movable body, the fixed control means comprise a first control device in the form of a fixed cam control device, and the movable control unit comprises a second and a third control device in the form of movable cam control devices;
   the second control device controlling the first movement and cooperating with the first control device to control part of the second movement; the third control device controlling the third movement; and the elastic means imparting the rest of the second movement to the second movable body.

9. The brewing apparatus as claimed in claim 8, wherein said movable control unit comprises at least one disk fitted to the frame to oscillate about the fixed axis and having two opposite faces; the second and third control device being formed on respective said faces of the disk.

10. The brewing apparatus as claimed in claim 9, wherein the disk has external teeth meshing with said drive.

11. The brewing apparatus as claimed in claim 8, and comprising a fourth movable body interposed between the movable control unit and the third movable body; the fourth movable body comprising a rod movable axially in a radial direction with respect to the fixed axis.

12. The brewing apparatus as claimed in claim 1, and comprising a first and second cam follower connected to the fixed and movable control means to transmit at least part of the respective said movements to the movable bodies.

13. The brewing apparatus as claimed in claim 12, wherein:
   elastic means are interposed between the first and second movable body, the fixed control means comprise a first control device in the form of a fixed cam control device, and the movable control unit comprises a second and a third control device in the form of movable cam control devices;
   the second control device controlling the first movement and cooperating with the first control device to control part of the second movement;
   the third control device controlling the third movement; and the elastic means imparting the rest of the second movement to the second movable body;

the first cam follower is connected to the first and second control device to transmit the first movement and part of the second movement to the first and second movable body respectively; and the second cam follower is connected to the third control device to transmit the third movement to the third movable body.

14. The brewing apparatus as claimed in claim 13, wherein the second movable body comprises a further rod intersecting the fixed axis and movable axially with respect to the first movable body in opposition to the elastic means; the first cam follower being carried by the further rod.

15. The brewing apparatus as claimed in claim 13, wherein the frame comprises a plate; the first control device comprises a window formed through the plate; and the first cam follower extends through the window of the first control device, and engages the second control device.

16. The brewing apparatus as claimed in claim 15, wherein the window of the first control device comprises a branch extending about the fixed axis and having a recess engaged by the first cam follower and for keeping the first cam follower in a fixed position.

17. The brewing apparatus as claimed in claim 13, comprising a fourth movable body interposed between the movable control unit and the third movable body; the fourth movable body comprising a rod movable axially in a radial direction with respect to the fixed axis; and wherein the second cam follower is fitted to a first end of said rod; a second end of the rod being connected to the second movable body.

18. A brewed beverage vending machine comprising the brewing apparatus as claimed in claim 17.

\* \* \* \* \*

UNITED STATES PATENT AND TRADEMARK OFFICE
CERTIFICATE OF CORRECTION

PATENT NO.       : 8,616,115 B2                                    Page 1 of 1
APPLICATION NO.  : 12/668162
DATED            : December 31, 2013
INVENTOR(S)      : Alessandro Magno It is certified that error appears in the above-identified patent and that said Letters Patent is hereby corrected as shown below:

Title Page, Item (30)
Line 2, change "PN2007A" to --PN2007A000049--

Signed and Sealed this
Twelfth Day of August, 2014

Michelle K. Lee
*Deputy Director of the United States Patent and Trademark Office*